March 4, 1958  L. T. SACHTLEBEN ET AL  2,825,262
OPTICAL SEGMENTATION DEVICE

Filed July 29, 1954  2 Sheets-Sheet 1

INVENTORS
Laurence T. Sachtleben
& Edward Kornstein

BY Morris R. Rebstein

ATTORNEY

March 4, 1958  L. T. SACHTLEBEN ET AL  2,825,262
OPTICAL SEGMENTATION DEVICE
Filed July 29, 1954  2 Sheets-Sheet 2

INVENTORS
Lawrence T. Sachtleben
& Edward Kornstein
BY
ATTORNEY

2,825,262
Patented Mar. 4, 1958

2,825,262

OPTICAL SEGMENTATION DEVICE

Lawrence Theron Sachtleben, Haddonfield, and Edward Kornstein, Camden, N. J., assignors, by mesne assignments, to the United States of America as represented by the Secretary of the Air Force Application July 29, 1954, Serial No. 446,550

7 Claims. (Cl. 88—16)

This invention relates to an optical device for segmenting a wide field of observation, and more particularly to a segmenting device which enables a camera having a relatively small field of view to record successive images of segments which make up a wide field of observation.

A camera, for example, of the photographic or television type may be used to record a field of observation. This field of observation, for example, may be a horizontal panorama or a strip of terrain viewed from an airborne device.

If a camera is used to record a wide field whose angular subtense at the camera lens is greater than the angular field diameter of the lens, this wide field may be divided into a series of segments which can be accepted by the lens. The images of these segments are then recorded one at a time and must remain substantially stationary relative to the camera while they are being recorded.

In certain applications such as aerial reconnaissance or mapping, successive segments must be rapidly recorded. If the camera itself were rapidly pointed at the different segments prohibitive inertia forces would be introduced by the rapid accelerations, reversals and stops. Movement of the camera would introduce other operative problems. This invention provides an optical device which avoids these problems.

An object of this invention is to provide an optical device which presents to a relatively fixed camera a series of stationary images of segments of a field of observation in rapid sequence.

Another object is to provide a relatively simple device for deviating the field of an optical system discontinuously through a series of discrete predetermined orientations.

A further object is to provide a simple device for presenting to a camera fixed in an air-borne device a series of stationary images of segments which make up successive strips of terrain.

Still a further object is to provide a device for enabling an optical system having a relatively small field of view to cover a wide field of observation.

In accordance with this invention, pairs of plane reflectors are mounted upon a movable member. The reflectors of each of the pairs are mutually disposed at predetermined angles. The pairs of reflectors and the member are cooperatively positioned with respect to an optical system so that the field of view of the system is reflected successively by the reflectors of each of the pairs. The movable member and the reflector pairs are disposed with respect to the optical system so that there is no relative motion between a principal section of a pair of reflectors and the optical system when its field is being reflected therein. If a fixed ray lying in a principal section of a mutually fixed pair of plane reflectors is reflected successively at the two surfaces thereof, the change in direction of the ray after two successive reflections is solely a function of the angle between the reflectors. Each pair, therefore, deviates the optical axis an amount which depends only upon the predetermined angle between the reflectors of each pair. These predetermined angles are arranged to deviate the optical axis to predetermined segments of the field of observation. Stationary images of these segments are, therefore, successively presented to the camera as the member is moved. The pairs of reflectors may be positioned about the periphery of a rotatable member in the aforementioned manner. As this member is rotated, successive images are cyclically presented to the camera.

Other objects and advantages of the present invention will become apparent to one skilled in the art from a reading of the following specification in conjunction with the accompanying drawings of an illustrative example constructed according to the teaching of the present invention in which:

Fig. 1 is a schematic view in elevation of an embodiment having one rotatable member and two optical systems or cameras;

Fig. 3 is a schematic diagram of the segments plotted on a field of observation by these successive deviations of these fields of view.

Figure 4:
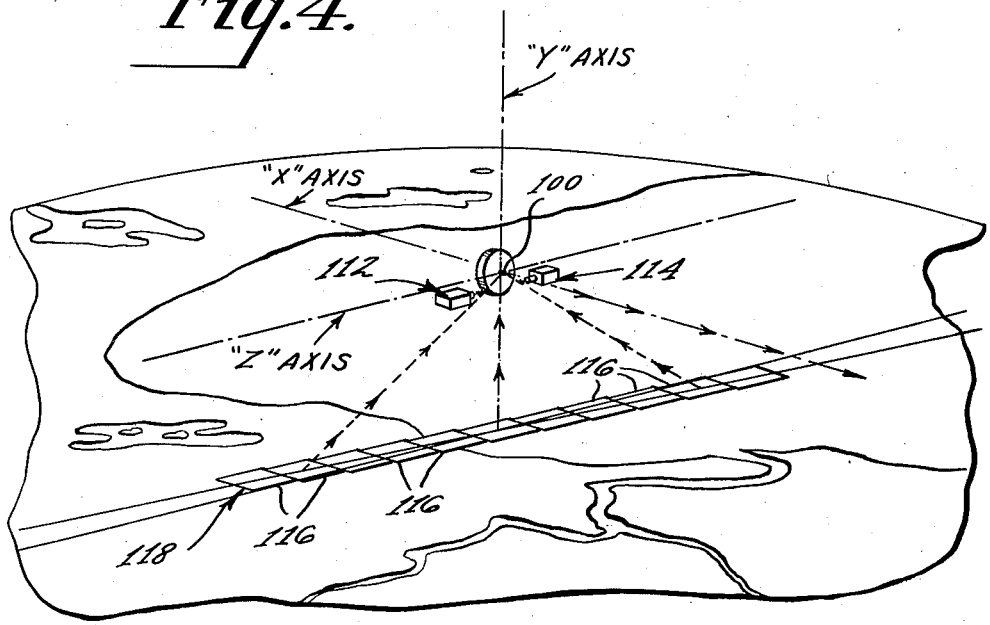
Fig. 4 is a perspective view showing the relative positions of the elements of this invention when used to scan a strip of terrain from an air-borne device.

In Figure 1 is shown a movable member which, for example may be a rotatable disc or drum 100. The drum is mounted to rotate freely about the central axis 101. A number of pairs of reflectors are mounted about the periphery of the drum. The pairs of reflectors are arranged so that their principal sections are perpendicular to the axis of rotation 101. A principal section of a pair of inclined plane reflectors is defined as a section made by a plane perpendicular to the line of the intersection of the reflectors. Three of these pairs are shown. Optical systems which may be cameras 112 and 114 having lenses 113 and 115 are shown fixed in predetermined positions with respect to the rotating drum.

The number of pairs of reflectors mounted about the periphery of the drum determines the number of positions or orientations through which the fields of view of these cameras are deviated with one rotation of the drum. In this embodiment, for example, 18 pairs of reflectors are mounted about the periphery of the drum. Each field is, therefore, deviated to scan or plot 18 stationary segments of the field of observation. Only one camera or optical system may be used with the drum if desired. This would provide 18 segments. More than one camera, however, may be used with each drum to multiply the number of segments and to, therefore, enlarge the field of observation.

A drum having 18 pairs of reflectors, for example, may be subdivided into 18 sectors occupying equal central angles of the drum. The drum 100 is shown subdivided, therefore, into 18 sectors occupying equal central angles. These sectors are designated by reference characters which identify the positions to which their reflector pair deviates the field of view of each of the cameras.

Figure 2:
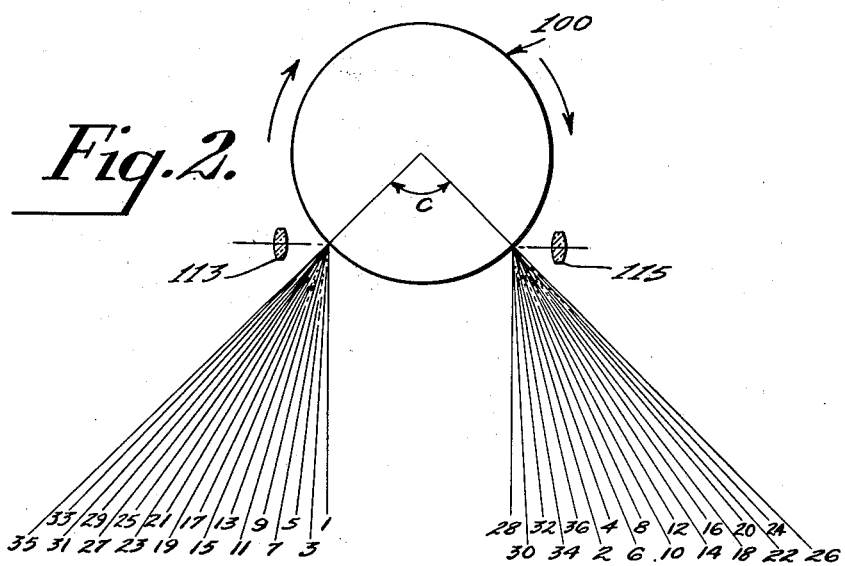
Fig. 2 is a schematic diagram showing the various positions to which the fields of view of these systems are deviated upon movement of the rotating member.

Referring to Figure 1 in conjunction with Figures 2 and 3, each reflector pair deviates each field of view to an orientation predetermined by the angle between each pair of mirrors. The set of eighteen pairs, therefore, deviates each field to eighteen positions. The positions to which the field of camera 112 is deviated may be designated by odd numbers, for example 1 to 35. The field of camera 114 may be deviated to eighteen positions which may be designated by the even numbers, 2 to 36. The angles between the numbers of successive pairs of mirrors may be arranged to deviate the fields to successive segments which are ordinally indicated by the numbered positions shown in Figure 2. In Fig. 2 all of the various positions to which the fields are deviated upon rotation of the drum are plotted on one diagram. Each position or orientation is labeled to indicate the composite order of deviation of the fields. The initial deviation is arbitrarily set as the smallest deviation angle of the field of camera 112. The successively larger deviations of this field are designated by successive odd numbers from 1 to 35. The corresponding deviations of the field of camera 114 are designated by even numbers ranging from 2 to 36.

The central angles or sectors of the drum 100 may be designated by the combination of an odd number from the group 1 to 35 together with an even number from the group 2 to 36 to correspond with the orientation to which its pair of reflectors deviates each field. An odd reference number indicates an orientation of the field of camera 112, and an even number indicates an orientation of the field of camera 114. In this illustrative example the sectors may be, therefore, designated as follows: $S_{1+28}$, $S_{3+30}$, $S_{5+32}$, $S_{7+34}$, $S_{9+36}$, $S_{11+2}$, $S_{13+4}$, $S_{15+6}$, $S_{17+8}$, $S_{19+10}$, $S_{21+12}$, $S_{23+14}$, $S_{25+16}$, $S_{27+18}$, $S_{29+20}$, $S_{31+22}$, $S_{33+24}$, and $S_{35+26}$.

In Fig. 1 are shown three of the pairs of reflectors arranged at their predetermined angles. These pairs of reflectors may also be designated by the orientations or positions to which they deviate the fields. These illustrative pairs may be designated by reference characters $R_{1+28}$, $R_{29+20}$ and $R_{2+11}$.

These reflectors may be plane reflectors and may be formed by plane mirrors or by external reflecting sides of prisms. The reflecting surfaces must be coated to provide adequate reflectance in a suitable spectrum range. The mutual angles or dihedral angles between each of the pairs of reflectors are designated for convenience by the angle "B." For convenience in design and fabrication the dihedral vertex of each of the pairs may lie upon the center line of the corresponding sectors of the drum, and the outer or entrance edges of the pairs may lie at the point of intersection of each of the sides of the sector with a predetermined circle. For 18 pairs of reflectors arranged in the aforementioned manner the reflectors of each pair may be arranged in a series of dihedral angles "B" with respect to one another to deviate a fixed ray or field of view after two successive reflections through a corresponding series of deviation angles "A." For the given illustrative mirror pairs, the following table will show the angles "A" which define the directions to which fixed rays or fields of view of fixed optical systems are deviated by reflectors mutually fixed at the predetermined angles "B."

|    | Pair of Reflectors | Deviation Angle A (Degrees) | Dihedral Angle B (Degrees) |
|----|---|---|---|
| 1  | $R_{1+28}$  | 90.960  | 45.480  |
| 2  | $R_{3+30}$  | 92.725  | 46.3625 |
| 3  | $R_{5+32}$  | 94.490  | 47.245  |
| 4  | $R_{7+34}$  | 96.255  | 48.1275 |
| 5  | $R_{9+36}$  | 98.020  | 49.010  |
| 6  | $R_{11+2}$  | 99.785  | 49.8925 |
| 7  | $R_{13+4}$  | 101.550 | 50.775  |
| 8  | $R_{15+6}$  | 103.315 | 51.6575 |
| 9  | $R_{17+8}$  | 105.080 | 52.540  |
| 10 | $R_{19+10}$ | 106.845 | 53.4225 |
| 11 | $R_{21+12}$ | 108.610 | 54.305  |
| 12 | $R_{23+14}$ | 110.375 | 55.1875 |
| 13 | $R_{25+16}$ | 112.140 | 56.070  |
| 14 | $R_{27+18}$ | 113.905 | 56.9525 |
| 15 | $R_{29+20}$ | 115.670 | 57.835  |
| 16 | $R_{31+22}$ | 117.435 | 58.7175 |
| 17 | $R_{33+24}$ | 119.200 | 59.600  |
| 18 | $R_{35+26}$ | 120.965 | 60.4825 |

If the reflectors making up these pairs are arranged at these dihedral angles "B" they will deviate the given fields of view through the specified deviation angles "A." Other angular relationships may be used between the reflectors making up each pair to deviate a field of view to cover other predetermined fields of observation. The particular angles are specified herein merely to illustrate one specific arrangement that may be used to cover an illustrative field of observation. These angles have been worked out to allow a lens which has a field angle of 2.35 degrees to cover a total angular field of approximately 62°. A slight overlap has been allowed to provide full coverage of the field of observation. The mirror pair $R_{1+28}$ has been arranged at a dihedral angle "B" to provide a deviation angle "A" slightly greater than 90°. This arrangement prevents excessive overlap between segments 1 and 28, as shown in Fig. 3.

The principal sections of each of the pairs lie in a plane parallel to the plane of rotation of the drum. There is, therefore, no relative motion between a principal section of the pairs and the optical system when its field is being reflected therein. The optical systems may be disposed in positions with respect to the pairs with the limitation that there is no relative motion between principal sections of the pairs and the optical systems while their fields are being reflected therein.

As the drum rotates, each field in succession is reflected successively at the reflectors of each pair of reflectors. If a fixed ray lying in a principal section of a mutually fixed pair of plane reflectors is reflected successively at the two surfaces thereof, the change in direction of the ray after two successive reflections is solely a function of the angle between the reflectors. Since the principal sections of each of the pairs are perpendicular to the axis of rotation of the drum, there is no relative motion between principal sections of the pairs and the optical systems. These deviations are, therefore, solely functions of the angles between the mirrors of each pair. A stationary image is, therefore, presented to the camera for each orientation or deviation.

In Fig. 1 a timing device or sync pulsing device 120 is connected in the cameras to open their shutters at the proper instant to record the stationary image of a particular segment. For television type cameras a synchronous motor 122 may be provided to drive the drum 100. The sync pulsing device 120 may be the vertical sync generator of a television camera system. This sync generator may be connected to the synchronous motor to actuate the cameras in proper phase with respect to the rotating drum and pairs of reflectors. For photographic cameras other well known pulse operated devices to actuate the shutter in synchronism with the rotational phase of the motor driving the drum may be used.

As the drum rotates, each of the fields of view is accepted within one pair of mirrors only at discrete periods of time. At all other times they are accepted by two pairs at the same time. When a field is accepted within only one pair, a single stationary image is provided. When it is split between two pairs, two blending stationary images are provided.

The image recording rate is arranged so that a camera is actuated only when a single image is provided. The image must be recorded only when the full field of view of one of the optical systems is accepted within only one pair of reflectors. The duration of the period of time available for recording the image depends upon many parameters such as the size of the drum, its rotational speed and the dimensions of the reflector pairs. The scanning speed of a TV camera or the shutter speed of a photographic camera must, therefore, be arranged to record these successive images during the period of time determined by these parameters.

Referring to Figs. 3 and 4, the rotating member and cameras may be mounted in an air-borne device which is flying in a direction parallel to the rotation axis of the drum, which may be designated "X." The vertical axis through the rotating drum may be designated "Y" and a transverse horizontal axis through the drum may be designated "Z." As the rotating drum and the cameras are carried over a section of terrain, the pairs of reflectors rotating with the drum deviate the field of view of the cameras through the described orientations. The various orientations cover a strip of terrain 118 which may be made up of individual segments 116.

In Fig. 3 are shown two successive strips which are mapped by this illustrative air-borne embodiment. If the air-borne device is arranged to fly at a predetermined rate of speed and the drum arranged to rotate at a predetermined speed, each of the segments included within the field of view of the cameras will lie contiguous or adjacent to one another. Each of these segments is numbered in accordance with the deviations or orientations 1 to 36 shown in Fig. 2. The adjacent segments are shown slanting backward from one another away from the direction of flight. This staggering of segments is a result of the distance travelled by the plane during the time between successive presentations of each segment to the camera. The central even-numbered segments are taken out of consecutive numerical order as a result of the gap caused by the reflector pairs between the two optical axes. The succeeding or following strip of terrain is also shown in Fig. 3 designated by numbers 1 to 36 with prime exponents. They are, therefore, designated segments 1' to 36'. An area of terrain may be continuously reconnoitered or mapped by cameras whose fields of view are deviated by this device. Since the drum rotates only in one direction, it may be economically rotated by an inexpensive motor. The successive presentation of stationary images to the camera greatly simplifies the recording problem.

An embodiment of this invention has been shown and described which enables an optical system having a relatively small field of view to cover a wide field of observation. An arrangement of this embodiment has also been described demonstrating how this device may be used in an air-borne device to map successive strips of terrain.

What is claimed is:

1. A device for deviating the field of view of an optical system discontinuously through a series of discrete orientations comprising a plurality of pairs of plane reflectors, the reflectors of each of said pairs being mutually disposed at a different predetermined angle to each other, means associated with each of said pairs for moving said pairs in a path relative to said optical system, said path being disposed relative to said optical system so that said field of view is reflected successively by the reflectors of each of said pairs, and said optical system being disposed relative to said path so that there is no relative motion between said optical system and a principal section of each of said pairs of reflectors while its field is being reflected successively therein.

2. A device for deviating the field of view of an optical system discontinuously through a series of discrete orientations comprising a plurality of pairs of plane reflectors, the reflectors of each of said pairs being mutually disposed at a different predetermined angle to each other, means associated with each of said pairs for moving said pairs in a path relative to said optical system so that the field of view of said optical system is reflected successively by the reflectors of each of said pairs, said moving means being disposed relative to said optical system so that there is no relative motion between said optical system and a principal section of each said pairs while its field is being reflected successively therein, and said moving means including means for moving said pairs in a continuous cycle within said path.

3. A device for deviating the field of view of an optical system discontinuously through a series of discrete orientations comprising a rotatable member, a plurality of pairs of plane reflectors mounted peripherally about said rotatable member, the reflectors of each of said pairs being mutually disposed at a different predetermined angle to each other, and said rotatable member being disposed relative to said optical system so that said field is reflected successively by the reflectors of each of said pairs when said member is rotated and when there is no relative movement between said optical system and a principal section of each of said pairs of reflectors.

4. An optical device for presenting to a camera having a relatively fixed field of view a series of substantially stationary images of segments of a field of observation comprising a rotatable drum, a plurality of pairs of plane reflectors mounted upon said drum, the reflectors of each of said pairs being mutually disposed at a different predetermined angle to each other, and said reflectors and said drum being mutually disposed relative to said camera so that said field of view is reflected successively by the reflectors of each of said pairs upon rotation of said drum and when there is no relative movement between a principal section of each of said pairs of reflectors and said camera.

5. The invention comprising the combination set forth in claim 4 wherein said different predetermined angles correspond to segments of said field of observation, so that continued rotation of said drum presents images of said segments in a predetermined sequence and in continuous cycle.

6. An optical device for presenting to cameras having relatively fixed fields of view a series of substantially stationary images of segments of a field of observation comprising a rotatable drum, a plurality of pairs of plane reflectors mounted upon said drum, the reflectors of each of said pairs being mutually disposed at a different predetermined angle to each other, and said reflectors and said drum being disposed relative to said cameras so that said fields of view are reflected successively at the reflectors of each of said pairs upon rotation of said drum and when there is no relative motion between said cameras and a principal section of each of said reflectors.

7. A device for enabling a fixed camera having a relatively small field of view to record a wide field of observation comprising a rotatable drum, a plurality of pairs of plane reflectors mounted upon said drum with their principal planes perpendicular to the axis of rotation of said drum, said field of view being disposed relative to said drum to be successively reflected by the reflectors of each of said pairs of reflectors, and said reflectors of each of said pairs being mutually disposed at a different predetermined angle to each other to deviate said field of view and to cover said field of observation in a series of discrete orientations.

References Cited in the file of this patent

FOREIGN PATENTS 416,994    Germany _____ Aug. 1, 1925

OTHER REFERENCES

Miller et al.: article in Journal of the Society of Motion Picture and Television Engineers, vol. 60, February 1953, pages 130–144.